United States Patent [19]

Brundage et al.

[11] Patent Number: 5,797,081
[45] Date of Patent: Aug. 18, 1998

[54] METHOD FOR RAPID STIFFENING OF EXTRUDATES

[75] Inventors: Kevin R. Brundage, Corning; Devi Chalasani, Painted Post, both of N.Y.; Ronald E. Johnson, Tioga, Pa.

[73] Assignee: Corning Incorporated, Corning, N.Y.

[21] Appl. No.: 852,765

[22] Filed: May 7, 1997

Related U.S. Application Data

[60] Provisional application No. 60/017,996 May 20, 1996.
[51] Int. Cl.$^6$ .................... B22F 3/20; B29C 47/00
[52] U.S. Cl. .................... 419/67; 419/41; 264/109; 264/148; 264/177.18; 264/178 R; 264/195
[58] Field of Search ............ 419/41.67; 264/109, 264/148, 176.1, 177.18, 178 R, 191, 195

[56] References Cited

U.S. PATENT DOCUMENTS

| | | | |
|---|---|---|---|
| 3,885,977 | 5/1975 | Lachman et al. | 106/62 |
| 3,963,504 | 6/1976 | Lundsager | 106/41 |
| 4,293,514 | 10/1981 | Wada | 264/61 |
| 4,721,599 | 1/1988 | Nakamura | 419/23 |
| 4,725,391 | 2/1988 | Bardhan et al. | 264/82 |
| 4,758,272 | 7/1988 | Pierotti et al. | 75/246 |
| 4,992,233 | 2/1991 | Swaroop et al. | 419/2 |
| 5,258,205 | 11/1993 | Wu | 427/393.6 |
| 5,427,601 | 6/1995 | Harada et al. | 75/235 |

*Primary Examiner*—Daniel J. Jenkins
*Attorney, Agent, or Firm*—L. Rita Quatrini

[57] ABSTRACT

An improvement in a method of extruding a plasticized powder mixture having a thermally gellable binder carried in an aqueous vehicle, by passing the mixture through an extruder and then through a die to produce an extrudate, the improvement being the additional step of contacting the extrudate directly after it leaves the die with an agent for simultaneously lowering the gel point of the binder and dehydrating the extrudate. The result is a stiffening of the extrudate in a shorter time than it would be, absent the additional step.

9 Claims, No Drawings

METHOD FOR RAPID STIFFENING OF EXTRUDATES

This application claims the benefit of U.S. Provisional Application No. 60/017,996, filed May 20, 1996 entitled METHOD FOR RAPID STIFFENING OF EXTRUDATES, by Kevin R. Brundage, Devi Chalasani and Ronald E. Johnson.

This invention relates to a method for rapid stiffening of extrudates having a thermally gellable binder by contacting the extrudate with an agent for lowering the gel point of the binder. More particularly, the invention relates to stiffening multicellular extrudates having a thermally gellable cellulose ether binder by dipping into or spraying with glycerin or glycerin and ethylene glycol or low molecular weight ethylene glycol polymers.

BACKGROUND OF THE INVENTION

Powder mixtures having a cellulose ether binder are used in forming articles of various shapes. For example ceramic or metal powder mixtures are formed into honeycombs which are used as substrates in catalytic and adsorption applications. The mixtures must be well blended and homogeneous in order for the resulting shaped body to have good integrity in size and shape and uniform physical properties. The mixtures have organic additives in addition to the binders. These additives can be surfactants, lubricants, and dispersants and function as processing aids to enhance wetting thereby producing a uniform batch.

Rapid-setting characteristics are important for honeycomb substrates. If the cell walls of the honeycomb can be solidified quickly after forming, the dimension of the greenware will not be altered in subsequent cutting and handling steps. This is especially true for a fragile thin-walled or complex shaped product, or a product having a large frontal area.

Various techniques have been disclosed for rapid stiffening of such batches. For example U.S. Pat. No. 5,258,205 relates to adding various rapid setting additives e.g. surfactants, binders and water soluble polymers at elevated temperatures, e.g. around 70° C.

There still remains a need to further improve the setting up characteristics of formable mixtures. The present invention fills this need.

SUMMARY OF THE INVENTION

In accordance with one aspect of the invention there is provided an improvement in a method of extruding a plasticized powder mixture having a thermally gellable binder carried in an aqueous vehicle, by passing the mixture through an extruder and then through a die to produce an extrudate, the improvement being the additional step of contacting the extrudate directly after it leaves the die with an agent for simultaneously lowering the gel point of the binder and dehydrating the extrudate. The result is a stiffening of the extrudate in a shorter time than it would be, absent the additional step.

DETAILED DESCRIPTION OF THE INVENTION

The present invention relates to a technique for rapid stiffening of an extrudate from extrusion of plasticized mixtures of powder materials and a thermally gellable polymeric organic binder, such as certain cellulose ethers, carried in an aqueous vehicle. The improvement involves contacting the extrudate with a gel point lowering agent after the extrudate leaves the extrusion die. The gel point is a function of the concentration of the binder, that is, the measured gel temperature decreases as the concentration of thermally gelling polymer increases. The gel point lowering agent removes water associated with the binder. As a result of this water removal, the ratio of binder to water in the extrudate increases resulting in association of polymer chains of the binder. This interaction of chains causes the binder to gel, hence, the lowering of the gel point. The result is rapid and homogeneous stiffening of the extrudate. This technique offers the double benefit of simultaneous stiffening and dehydration and can possibly reduce the need for further extensive drying procedures.

The Powder Material

The powders which can be used are any of those that when combined with the thermally gellable organic binder can be shaped into a body.

Typical powders are inorganics such as metal, ceramic, glass ceramic, glass, and molecular sieve, or combinations of these.

The invention is especially suitable for use with metal powders. Metal powder mixtures generally have less water and are less hydrophilic than many other powders, e.g. ceramic mixtures, and in consequence the stiffening effects are therefore more pronounced than with mixtures having more water.

Any sinterable metal or metal composition can be used in the practice of the present invention. Especially suited are iron group metal, chromium, and aluminum compositions, with the preferred iron group metal being iron. Especially preferred is Fe, Al, and Cr. For example, Fe5–20Al5–40Cr, and Fe7–10Al10–20Cr powders with other possible additions are especially suited. Some typical compositions of metal powders are disclosed in U.S. Pat. Nos. 4,992,233, 4,758,272, and 5,427,601 which are herein incorporated by reference as filed. U.S. Pat. No. 4,992,233 relates to methods of producing porous sintered bodies made from metal powder compositions of Fe and Al with optional additions of Sn, Cu, and Cr. U.S. Pat. No. 5,427,601 relates to porous sintered bodies having a composition consisting essentially of in percent by weight about 5 to about 40 chromium, about 2 to about 30 aluminum, 0 to about 5 of special metal, 0 to about 4 of rare earth oxide additive and the balance being iron group metal, and unavoidable impurities such as eg., Mn or Mo, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanides, Zr, Hf, Ti, Si, and B, with optional additions of alkaline earths, Cu, and Sn. In general the metal and/or metal alloy powders and optionally rare earth oxide powders are mixed in amounts to result in the body having the desired composition. The starting metal powders are iron, cobalt, nickel, chromium, aluminum metals, and special metal powders, if they are to be used. The metal can be supplied in either the unalloyed form or alloyed with one or more of the other metals, or partially unalloyed and partially alloyed. Most typically, however, the iron, when added as the balance, is in the elemental form. The chromium can be elemental or alloyed with aluminum or iron. Chromium-aluminum alloy is preferable. Typically, the aluminum is supplied alloyed with iron and/or chromium for stability. Some typical alloy powders that can be used in formulating the mix to yield a body having some typical compositions of the present invention are Fe-Cr-Al-(Y, lanthanide series elements, Zr, Hf, or Cu) alloy powder, Cr-Al-(Y, lanthanide series elements, Zr, Hf, or Cu) alloy powder, Fe-B, Fe-Si powder, etc.

In general, the powder material is fine powder (in contrast to coarse grained materials) some components of which can either impart plasticity, such as clays, when mixed with a vehicle such as water, or which when combined with the organic binder can contribute to plasticity.

Ceramic, glass ceramic and glass ceramic powders are also meant to include those materials which when fired include as a predominant phase: ceramic, glass-ceramic, glass, and combinations thereof. By combinations is meant physical or chemical combinations, eg., mixtures or composites. Examples of these powder materials are cordierite, mullite, clay, talc, zircon, zirconia, spinel, aluminas and their precursors, silicas and their precursors, silicates, aluminates, lithium aluminosilicates, alumina silica, feldspar, titania, fused silica, nitrides, carbides, borides, eg., silicon carbide, silicon nitride, soda lime, aluminosilicate, borosilicate, soda barium borosilicate or mixtures of these, as well as others.

Especially suited are ceramic materials, such as those that yield cordierite, mullite, or mixtures of these on firing, some examples of such mixtures being, for example, about 55% to about 60% mullite, and about 30% to about 45% cordierite, with allowance for other phases, typically up to about 10% by weight. Some ceramic batch material compositions for forming cordierite that are especially suited to the practice of the present invention are those disclosed in U.S. Pat. No. 3,885,977 which is herein incorporated by reference as filed.

In accordance with a preferred embodiment, one composition which ultimately forms cordierite upon firing is as follows in percent by weight, although it is to be understood that the invention is not limited to such: about 33 to about 41, and most preferably about 34 to about 40 of aluminum oxide, about 46 to about 53 and most preferably about 48 to about 52 of silica, and about 11 to about 17 and most preferably about 12 to about 16 magnesium oxide.

The powders can be synthetically produced materials such as oxides, hydroxides, etc, or they can be naturally occurring minerals such as clays, talcs, or any combination of these. The invention is not limited to the types of powders or raw materials. These can be chosen depending on the properties desired in the body.

Some typical kinds of powder materials are given below. The particle size is given as median particle diameter by Sedigraph analysis, and the surface area is given as $N_2$ BET surface area.

Some types of clay are non-delaminated kaolinite raw clay, having a particle size of about 7–9 micrometers, and a surface area of about 5–7 $m^2/g$, such as Hydrite MP™, those having a particle size of about 2–5 micrometers, and a surface area of about 10–14 $m^2/g$, such as Hydrite PX™, delaminated kaolinite having a particle size of about 1–3 micrometers, and a surface area of about 13–17 $m^2/g$, such as KAOPAQUE-10™ (K10), calcined clay, having a particle size of about 1–3 micrometers, and a surface area of about 6–8 $m^2/g$, such as Glomax LL. All of the above named materials are sold by Dry Branch Kaolin, Dry Branch, Ga.

Some typical kinds of talc are those having a surface area of about 5–8 $m^2/g$. One suitable talc is grade MB 96–67 supplied by Barretts Minerals.

Some typical aluminas are coarse aluminas, for example, Alcan C-700 series, such as those having a particle size of about 4–6 micrometers, and a surface area of about 0.5–1 $m^2/g$, eg., C-701™, fine alumina having a particle size of about 0.5–2 micrometers, and a surface area of about 8–11 $m^2/g$, such as A-16SG from Alcoa.

One typical kind of silica is that having a particle size of about 9–11 micrometers, and a surface area of about 4–6 $m^2/g$, such as IMSIL™ sold by Unimin Corporation.

In filter applications, such as in diesel particulate filters, it is customary to include a burnout agent in the mixture in an amount effective to obtain the porosity required for efficient filtering. A burnout agent is any particulate substance (not a binder) that burns out of the green body in the firing step. Some types of burnout agents that can be used, although it is to be understood that the invention is not limited to these, are non-waxy organics that are solid at room temperature, elemental carbon, and combinations of these. Some examples are graphite, cellulose, flour, etc. Elemental particulate carbon is preferred. Graphite is especially preferred because it has the least adverse effect on the processing. In an extrusion process, for example, the rheology of the mixture is good when graphite is used. Typically, the amount of graphite is about 10% to about 30%, and more typically about 15% to about 30% by weight based on the powder material.

In burnout-containing mixtures, particularly graphite-containing mixtures at the above described levels, it is sometimes advantageous for ram extrusion to include polyvinyl alcohol as co-binder in addition to the organic binder, e.g. methylcellulose and/or methylcellulose derivatives. It is advantageous to have about 2% to about 4% by weight polyvinyl alcohol. It is especially advantageous to have about 2% to about 4% by weight polyvinyl alcohol, and about 4% to about 6% methylcellulose and/or methylcellulose derivatives.

One especially advantageous composition for ram extrusion of a body for filter applications is as follows: about 25% to about 35% by weight graphite based on the powder material, as a burnout agent, water, and in percent by weight based on the powders and the burnout agent, about 2% to about 8% organic binder which can be methylcellulose, methylcellulose derivatives, and combinations thereof, about 0.5% to about 2.5% sodium stearate and about 0.3% to about 1.0% oleic acid as a lubricant. Especially suited with this composition is to have about 2% to about 4% polyvinyl alcohol as co-binder, and about 4% to about 6% by weight organic binder. Molecular sieves are crystalline substances having pores of size suitable for adsorbing molecules. The molecular sieve can be in the crystallized form or in the ammonium form or hydrogen form, or ion-exchanged with or impregnated with a cation. The molecular sieves can be provided in ion exchanged form or impregnated with cations either before forming into a body or after the product body has formed. The ion-exchange and impregnation methods are well known processes. Such treatments are within the scope of this invention.

Some types of molecular sieves which are preferred for the practice of the present invention are carbon molecular sieves, zeolites, metallophosphates, silicoaluminophosphates, and combinations of these. Carbon molecular sieves have well defined micropores made out of carbon material.

The molecular sieves that are especially suited to the invention are the zeolites. Some suitable zeolites are pentasil, such as ZSM-5, Y, such as ultrastable Y, beta, mordenite, X, such as 13X, or mixtures thereof.

The invention is also suited for mixtures that contain activated carbon or carbon precursors, e.g. thermosetting resins, that can be later activated.

The Organic Binder

The thermally gellable organic binder contributes to the plasticity of the mixture for shaping into a body. The plasticizing organic binder according to the present invention refers to cellulose ether binders. Some typical organic binders according to the present invention are methylcellulose, hydroxybutyl methylcellulose, hydroxymethylcellulose, hydroxypropyl methylcellulose, hydroxyethyl methylcellulose, and mixtures thereof. Methylcellulose and/or methylcellulose derivatives are especially suited as organic binders in the practice of the present invention with methylcellulose, hydroxypropyl methylcellulose, or combinations of these being preferred. Preferred sources of cellulose ethers are Methocel A4M, F4M, F240, and K75M from Dow Chemical Co. Methocel A4M is a methylcellulose binder having a thermal gel point of about 50° C., and a gel strength of 5000 g/cm$^2$ (based on a 2% solution at 65° C.). Methocel F4M, F240, and K75M are hydroxypropyl methylcellulose. Methocels F4M and F240 have thermal gel points of about 54° C., and Methocel K75M has a gel point of about 70° C. (all based on a 2% solution in water).

In addition to the above components, the extrusion mixture can contain other water soluble polymers such as polyvinyl alcohol, polyethylene oxide, guar gum, cellulose ether derivatives which normally do not gel such as hydroxybutylcellulose, hydroxyethylcellulose, hydroxypropylcellulose, ethylhydroxy ethylcellulose, sodium carboxy methylcellulose, etc.

The weight percents of the organic binder and vehicle are calculated as superadditions with respect to the non-organic solids by the following formula:

$$\frac{\text{weight of binder, vehicle, or other additives}}{\text{weight units of non-organic solids}} \times 100.$$

The water vehicle content can vary depending on the type f materials to impart optimum handling properties and compatibility with other components in the mixture.

The extrusion operation can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die. The extrusion can be vertical or horizontal, with vertical being the most practical especially for dipping the extrudate into the agent bath.

The bodies according to the present invention can have any convenient size and shape and the invention is applicable to all processes in which powder mixtures having a thermally gellable binder are extruded and to the products made therefrom. However, the process is especially suited to production of cellular monolith bodies such as honeycombs. Cellular bodies find use in a number of applications such as catalytic, adsorption, electrically heated catalysts, filters such as diesel particulate filters, molten metal filters, regenerator cores, etc.

Some examples of honeycombs produced by the process of the present invention, although it is to be understood that the invention is not limited to such, are those having about 94 cells/cm$^2$ (about 600 cells/in$^2$), about 62 cells/cm$^2$ (about 400 cells/in$^2$), or about 47 cells/cm$^2$ (about 300 cells/in$^2$), those having about 31 cells/cm$^2$ (about 200 cells/in$^2$), or those having about 15 cells/cm2 (about 100 cells/in 2). Typical wall thicknesses are for example, about 0.15 mm (about 6 mils) for about 62 cells/cm$^2$ (about 400 cells/in$^2$) honeycombs. Wall (web) thicknesses range typically from about 0.1 to about 0.6 mm (about 4 to about 25 mils). The external size and shape of the body is controlled by the application, e.g. in automotive applications by engine size and space available for mounting, etc. Honeycombs having about 15 to about 30 cells/cm$^2$ (about 100 to about 200 cells/in$^2$) and about 0.30 to about 0.64 mm (about 12 to about 25 mil) wall thicknesses are especially suited for diesel particulate filter applications.

Stiffening is critical honeycombs having a large frontal area (typically about 12.7–22.9 cm (5–9") diameter and lower cell density and very thin walls, e.g. $\leq 0.13$ mm (5 mils) as such structures are more vulnerable to deformation as they leave the extrusion die. Therefore the rapid stiffening effects of the present invention are especially advantageous for those types of structures.

Another advantage of the rapid stiffening brought about by the present invention is that it allows for use of softer extrusion mixtures while maintaining the shape of the extrudate. Softer mixtures of inorganic powders which can be abrasive, extend the life of the extrusion die, even with the more abrasive powders.

Upon exit of the extrudate through the die, it is contacted with the gel point lowering agent. This can be done by direct immersion or dipping into a bath of the agent or by spraying the agent on the extrudate.

Immersion in a bath serves to stiffen and dry the entire extrudate body, e.g. outer skin and cells in a honeycomb. Spraying serves to stiffen those surfaces that come directly in contact with the spray, which is usually the outer skin as opposed to the cells in a honeycomb.

The gel point lowering agent can be glycerin, combinations of glycerin and ethylene glycol and its polymers, sorbitol, and high viscosity sugar solutions, e.g. corn syrup. Preferably the gel point lowering agent is either glycerin or a mixture of glycerin and monomeric ethylene glycol, or a mixture of glycerin and polyethylene glycol having a molecular weight of up to about 400, and preferably up to about 200.

It was found that when glycerin alone is used, it must be at a temperature of at least about 50° C., and usually between about 50° and 60° C. At lower temperatures, it is too viscous resulting in collapse of the extruded body. This effect is especially detrimental in the case of thin-walled honeycomb cells which are especially vulnerable to very viscous solutions. The ethylene glycol or its polymers in the mixtures allows the glycerin to function at ambient or room temperature because it has a lower viscosity than glycerin alone. The preferred gel point lowering agent at room temperature, (about 20°–25° C.), is a mixture of glycerin and ethylene glycol with volume ratios of ethylene glycol to glycerin being preferably about 2:1 to 3:1, and more preferably about 2:1.

Use of the above described gel point lowering agents according to this invention results in a more rapid stiffening of the extrudate than would otherwise happen. Examples of this rapid stiffening effect will be seen in the examples that follow.

To more fully illustrate the invention, the following non-limiting examples are presented. All parts, portions, and percentages are on a weight basis unless otherwise stated.

EXAMPLE 1

A powder metal composition as given in Table 1, about 1% oleic acid, about 2% A4M Methocel®, and about 2%

F240 Methocel® were mixed in a Littleford mixer for 5 minutes in nitrogen, and in a Muller mixer with 9% water. Part of the mixture was extruded first into spaghetti using a RAM extruder at pressures of about 900–1300 psi, and then through a small RAM extruder at pressures of about 1600–2000 psi into 2.54 cm (1") diameter cylindrical honeycombs directly into immersion baths of various blends of glycerin and glycols, about 5.1–7.6 cm (2–3") from the die. Immersions were done with the bath at both room temperature and elevated temperature. The stiffness of the extrudate was measured using the ball drop technique described below, measuring the ball drop as a function of dipping time.

The ball drop test was carried out using a Fischer Scientific Penetrometer which was adapted for this test. A ball of a given weight which is fastened to the bottom of the plunger rod is released and allowed to drop onto the test sample. The indentation made by the ball on the sample is measured. The degree of indentation is an indication of the stiffness or lack thereof of the sample. Lower ball drop numbers at a given load correspond to stiffer batches, with numbers less than about 80 being considered a stiff batch.

The ball drop deformation of the cellular extrudates with about 1.8 mm (70 mil) skin thickness ranged from 70–95. Table 2 shows the results of rapid setting expressed as ball drop numbers, of the honeycombs (about 2.54 cm (1") in diameter, about 53 cells/cm$^2$ (350 cells/in.$^2$), cell wall thicknesses of about 0.13 mm (5.1 mil) which were dipped at ambient temperature.

The results show that glycerin alone stiffened the honeycomb extrudate but caused collapse of the honeycomb cells on direct extrusion into the bath at ambient temperature. The viscosity of glycerin was too high (1340 cps at 24° C.). The glycerin was then heated to about 60° C. to lower the viscosity to about 123 cps. The cells did not collapse with glycerin alone at about 60° C. The stiffening was very effective as measured by the ball drop and qualitative feel. It is believed that the cell collapse is caused by the pressure imbalance created when the honeycomb enters the dipping liquid at a given velocity, and the inability (high viscosity) of the liquid to rise into the honeycomb at the same velocity. If the viscosity of the bath is too high, the liquid seals the honeycomb, creates a vacuum, and the cells collapse. At elevated temperatures, the vapor pressure plays a significant role in addition to the viscosity, enabling extrusions without cell collapse using liquids of relatively high viscosity. Without wishing to be bound by theory, it is believed that the higher vapor pressure along with relatively high mobility of the molecules in the liquid phase at elevated temperatures may be the cause for no cell collapse. Glycerin was diluted with water to lower the viscosity, and a 65/35 volume ratio of glycerin to water was determined to be the optimum ratio at which the cell collapse was not observed. The results in Table 2 show a dramatic improvement in stiffness after extruding into the bath for only about 30–45 seconds at room or ambient temperature. The ball drop changed from 77–85 to 20–33 in 30–45 seconds. Although the ball drop continued to drop with time (1 and 5 min.), the major change was observed in the initial 30–45 seconds dipping time, which indicates instantaneous stiffening. Ethylene glycol alone also works well to stiffen the batch as shown in Table 2, but not as effective when diluted with water (ball drop 47–55). This implies that the water tolerance for ethylene glycol is lower than that of glycerin. Blending glycerin and ethylene glycol provided the double benefit of (1) lowering the viscosity of glycerin alone, and (2) increasing the water tolerance of ethylene glycol alone, while maintaining stiffening capability. The ethylene glycol/glycerin (3/1) showed stiffening without cell collapse. The water pick up by the hydrophilic ethylene glycol was anticipated to be removed on a continuous circulating basis. The data shows that there is considerable tolerance for water (35%) without losing stiffening capability. The results with additives such as propylene glycol which raise the gel point of the cellulose ether binder were found to have the opposite effect i.e., softening the extrudate.

EXAMPLE 2

Extrusions were done similar to Example 1, except that a larger RAM extruder was used to extrude cylindrical honeycombs of about 9.3 cm (3.66") in diameter into various lengths. Some of the honeycombs were extruded directly into baths of various composition, which were about 7.6 cm (3") from the die for various lengths of time and tested for stiffness by the ball drop test. The ball drop results of dipping various length honeycombs for various lengths of time into a solution of 2/1 vol. ethylene glycol/glycerin are given in Table 3. The results show good stiffening for 45 seconds dipping time versus the undipped control for all the lengths given.

In order to determine the percent water exchanged by a given honeycomb with the ethylene glycol-glycerin in a given time, some of the extrudates were weighed before and after dipping. The bath was then analyzed for water. Results are given in Table 3A.

EXAMPLE 3

The bath water tolerance was determined by diluting an ethylene glycol/glycerin blend intentionally with water and then observing stiffening of honeycombs that were dipped into the respective baths. The blend was diluted with water to the point at which the ball drop results of both undiluted bath and the water diluted bath were identical. If more water is added beyond this point, the extrudate loses stiffness. Table 4 shows that a for 1:1 volume ratio of the 2/1 ethylene glycol/glycerin:water, ball drop deformation was higher (25–32) than for undiluted ethylene glycol/glycerin in a 2/1 vol. ratio, (5–6). However, at 2:1 volume ratio of the 2/1 ethylene glycol/glycerin blend : water, the ball drop deformation was identical to undiluted ethylene glycol/glycerin. Therefore, the 2:1 vol ratio of the 2/1 ethylene glycol/glycerin blend : water was considered to be the maximum water tolerance for the bath.

EXAMPLE 4

A cordierite forming batch of about 40.9% Barretts talc 96–67 about 32.6% Glomax LL clay, about 12.8% K10 clay, about 13.8% A16SG alumina, about 2.9% Methocel®F240, about 0.75% sodium stearate, and about 30–31% water was extruded into honeycombs which were dipped into a bath having a volume ratio of about 2:1 ethylene glycol : glycerin. The ball drop test measurements ranged from about 70 to 40, indicating good stiffening.

TABLE 1

| METAL POWDER COMPOSITION | | | |
|---|---|---|---|
| Raw Materials | (Parts by Weight) | Density (g/cm$^3$) | (Volume %) |
| Cr30Al | 23.3 | 5 | 16.9 |
| Electrolytic Cr | 1.7 | 7.2 | 0.8 |
| Fe20B | 0.3 | 6.1 | 0.1 |

TABLE 1-continued

METAL POWDER COMPOSITION

| Raw Materials | (Parts by Weight) | Density (g/cm³) | (Volume %) |
|---|---|---|---|
| BASF Carbonyl OM | 74.3 | 7.7 | 34.9 |
| Rhone Poulenc Y2O3 | 0.5 | 4.9 | 0.4 |
| Emersol 213 (Oleic Acid) | 1 | 0.9 | 4.1 |
| A4M (2%) + F240 (2%) | 4 | 1.4 | 10.4 |
| Water | 9 | 1 | 32.5 |

Metals (Volume %) 53.1

TABLE 2

STIFFENING VERSUS IMMERSION BATH COMPOSITION

| Immersion Bath Composition (Vol) | Viscosity CPS @ 24° C. | Ball Drop* (50 g Load) Dipping Time 30–45 Sec. | 1 Min | 5 Min |
|---|---|---|---|---|
| None-Control | | 85/80/78/77 | | |
| Glycerin | 1340 | Collapse | | |
| Glycerin/Water 75/25 | 49 | Collapse | | |
| Glycerin/Water 65/35 | 21.5 | 35/20/33 | 22/24/23 | 12/13/15 |
| Ethylene Glycol | 18.2 | 28/23/21 | 22/25/23 | 16/13/10 |
| Ethylene Glycol/Water 65/35 | 5 | 47/51/55 | | |
| Propylene Glycol/Water 65/35 | 10 | 90/99/120 | | |
| Ethylene Glycol/Glycerin 75/25 | 42.5 | 15/15/22/20/21 | | 5/4/9 |
| Ethylene Glycol/Glycerin 67/33 | 59 | 22/18/16 | 2 min 13/13/7 | 15 min 8/5/5 |

*Ball drop reading refer to three measurements on the same honeycomb.

TABLE 3

STIFFENING VIRSUS EXTRUDATE LENGTH

| DIPPING TIME | EXTRUDATE LENGTH (cm) | BALL DROP 50 g | 150 g |
|---|---|---|---|
| CONTROL | 15 | 58/45/48 | 58/64/60 |
| 45 sec. | 12 | 19/13/15 | 17/24/16 |
| 45 sec. | 30 | 9/9/8 | 21/15/22 |
| 5 min | 12 | 7/5/4 | 12/14/19 |
| 5 min | 12 | 3/3/5 | 7/7/8 |
| 5 min | 30 | 6/5/6 | 10/14/9 |
| 5 min | 30 | 9/8/6 | 12/8/8 |
| 15 min | 12 | 7/11/5 | 7/11/11 |
| 15 min | 12 | 1/2/1 | 4/3/2 |
| 15 min | 30 | 0/0/2 | 0/3/2 |
| 15 min | 30 | 3/4/1 | 1/3/1 |
| 15 min | 30 | 0/0/0 | 3/0/0 |
| 30 min | 12 | 3/1/1 | 4/4/5 |
| 30 min | 30 | 0/0/0 | 0/3/0 |
| 30 min | 30 | 0/0/0 | 0/1/0 |
| 30 min | 30 | 0/0/0 | 0/0/0 |

TABLE 3A

| Dipping Time | % Batch Water Removed |
|---|---|
| 15 sec | 20 |
| 45 sec | 38 |
| 5 min | 90 |
| 5 min | 98 |
| 60 min | 94 |

For a 15.2 cm (6") long honeycomb.

TABLE 4

STIFFENING VERSUS IMMERSION BATH WATER CONTENT

| IMMERSION BATH COMPOSITION (VOL) | BALL DROP 50 g | 150 g |
|---|---|---|
| CONTROL (NO DIPPING) | 58/45/48 | 58/64/60 |
| ETHYLENE GLYCOL/GLYCERIN 2/1 | 6/5/6 | 10/14/19 |
| ETHYLENE GLYCOL-GLYCERIN (2/1):WATER 2:1 | 5/3/6 | 14/15/19 |
| ETHYLENE GLYCOL-GLYCERIN (2/1):WATER 1:1 | 32/28/25 | 38/42/35 |

5 min. dipping time
30 cm long extrudates

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. In a method of extruding a plasticized powder mixture having a thermally gellable binder carried in an aqueous vehicle, by passing the mixture through an extruder and then through a die to produce an extrudate, the improvement comprising the additional step of contacting the extrudate directly after it leaves the die with an agent for simultaneously lowering the gel point of the binder and dehydrating the extrudate, whereby the extrudate is stiffened in a shorter time than it would be, absent the additional step, the agent being selected from the group consisting of glycerin at a temperature of at least about 50° C., and a mixture of glycerin and ethylene glycol ranging in molecular weight from monomeric to no greater than about 400 at ambient temperature.

2. The improvement of claim 1 wherein the powder material is selected from the group consisting of metal, ceramic, glass, glass ceramic, molecular sieve, and combinations thereof.

3. The improvement of claim 1 wherein the binder is selected from the group consisting of methylcellulose, hydroxybutyl methylcellulose, hydroxymethylcellulose, hydroxypropyl methylcellulose, hydroxyethyl methylcellulose, and mixtures thereof.

4. The improvement of claim 3 wherein the binder is selected from the group consisting of methylcellulose, methylcellulose derivatives, and combinations thereof.

5. The improvement of claim 1 wherein the gel point lowering agent is glycerin and monomeric ethylene glycol at ambient temperature.

6. The improvement of claim 5 wherein the volume ratio of ethylene glycol to glycerin is 2:1 to 3:1.

7. The improvement of claim 6 wherein said volume ratio is about 2:1.

8. The improvement of claim 1 wherein the extrudate is dipped into a bath of the gel point lowering agent.

9. The improvement of claim 1 wherein the extrudate is sprayed with the gel point lowering agent.

* * * * *